United States Patent
Ucar et al.

(10) Patent No.: US 11,881,107 B2
(45) Date of Patent: Jan. 23, 2024

(54) SYSTEMS AND METHODS FOR INFERRING PARKING DEPARTURES

(71) Applicant: Toyota Motor Engineering & Manufacturing North America, Inc., Plano, TX (US)

(72) Inventors: Seyhan Ucar, Mountain View, CA (US); Takamasa Higuchi, Mountain View, CA (US); Chang-Heng Wang, Cupertino, CA (US); Onur Altintas, Mountain View, CA (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 8 days.

(21) Appl. No.: 17/554,487

(22) Filed: Dec. 17, 2021

(65) Prior Publication Data

US 2023/0196917 A1 Jun. 22, 2023

(51) Int. Cl.
| | |
|---|---|
| *G08G 1/14* | (2006.01) |
| *G06N 5/04* | (2023.01) |
| *G06V 20/58* | (2022.01) |
| *H04W 4/46* | (2018.01) |
| *G08G 1/00* | (2006.01) |

(52) U.S. Cl.
CPC ............ *G08G 1/141* (2013.01); *G06N 5/04* (2013.01); *G06V 20/586* (2022.01); *G08G 1/146* (2013.01); *G08G 1/202* (2013.01); *H04W 4/46* (2018.02)

(58) Field of Classification Search
CPC ........ G08G 1/141; G08G 1/146; G08G 1/202; H04W 4/46; G06V 20/586; G06N 5/04
See application file for complete search history.

(56) References Cited

U.S. PATENT DOCUMENTS

| | | | |
|---|---|---|---|
| 9,990,587 B2 | 6/2018 | Okanohara et al. | |
| 10,290,073 B2 | 5/2019 | Amir | |
| 10,304,335 B2 | 5/2019 | Jain et al. | |
| 10,522,037 B1 | 12/2019 | Batra et al. | |
| 10,916,140 B2 | 2/2021 | Lu et al. | |
| 2005/0195095 A1 | 9/2005 | Kato et al. | |
| 2012/0056758 A1* | 3/2012 | Kuhlman ................ | G08G 1/14 340/932.2 |
| 2016/0196747 A1* | 7/2016 | Tsyrklevich ....... | G01C 21/3667 701/532 |
| 2018/0349792 A1 | 12/2018 | Zhao et al. | |
| 2020/0173808 A1 | 6/2020 | Beaurepaire et al. | |

(Continued)

FOREIGN PATENT DOCUMENTS

CN 104282169 A 1/2015

*Primary Examiner* — Kam Wan Ma
(74) *Attorney, Agent, or Firm* — Christopher G. Darrow; Darrow Mustafa PC

(57) ABSTRACT

Systems, methods, and other embodiments described herein relate to improving the identification of available parking spaces by inferring when a vehicle is likely to depart. In one embodiment, a method includes, responsive to acquiring sensor data about a surrounding environment including at least one parked vehicle, extracting a feature from the sensor data about a context of the parked vehicle. The method includes analyzing the feature to determine a status of the vehicle in relation to whether the vehicle is remaining parked. The method includes providing the status to inform additional vehicles about an availability of a parking spot of the parked vehicle.

20 Claims, 9 Drawing Sheets

(56) References Cited

U.S. PATENT DOCUMENTS

2020/0211071 A1\* 7/2020 Rosas-Maxemin .... G06N 20/00
2020/0258386 A1 8/2020 Lu et al.
2020/0311848 A1 10/2020 Weldemariam et al.
2021/0158410 A1 5/2021 Rosas-Maxemin et al.
2022/0415173 A1\* 12/2022 Agarwal ........... B60W 50/0097

\* cited by examiner

so little to begin.

SYSTEMS AND METHODS FOR INFERRING PARKING DEPARTURES

TECHNICAL FIELD

The subject matter described herein relates, in general, to improving the identification of parking availability and, more particularly, to inferring the departure of vehicles from parking spaces according to contextual indicators.

BACKGROUND

Parking a vehicle, especially within congested urban areas, can be a time-consuming task. For example, a driver is often tasked with finding parking without knowledge of whether parking within a location is even available. That is, a vehicle may proceed to a desired destination without knowledge of the availability of parking at the destination, including entering a parking garage, a parking lot, etc., without knowing whether the destination includes any available spots. Even still, if such parking locations are nearly full, finding an available spot can prove to be a task that involves an extended period of time searching for a spot, which is generally undesirable. Additionally, some drivers may resort to techniques to find parking, such as stalking people walking to a vehicle, waiting for vehicles to leave when people are present about the vehicle, and so on. However, such tactics may not provide desirable outcomes when, for example, the person does not leave in a timely manner or is simply dropping off or picking up an item from a vehicle. As such, attempts to park in congested locations can be time-consuming and generally inefficient as drivers circle parking garages and other locations on the hunt for an available parking space.

SUMMARY

In various embodiments, example systems and methods relate to a manner of improving the identification of available parking spaces by inferring when a vehicle is likely to depart. As previously noted, locating parking can be a time-consuming task that can result in delaying the arrival of a driver and general frustration for the driver when attempting to locate available spaces within a busy location. While some connected vehicles can scan parking areas and identify available parking spots for communication to a cloud-based system, which may share availability information, this information is generally limited to spots that are presently open. Accordingly, in a heavily congested parking lot/garage, information about available spots may provide little useful information.

Therefore, in one or more embodiments, an inventive system is disclosed that improves the identification of potentially available parking spaces by inferring when a vehicle may leave according to contextual indicators. For example, in at least one arrangement, a parking system acquires sensor data as a vehicle travels through an area of parking. The vehicle may be a vehicle that is itself searching for parking or is simply providing availability monitoring functionality as a secondary task of navigating to a destination. In either case, the vehicle collects the sensor data about the surrounding environment, which may include at least one parked vehicle. Thus, the parking system identifies the parked vehicle within the sensor data and extracts features about the vehicle. The features include, in at least one approach, contextual indicators that provide insights about whether the parked vehicle is likely to move. For example, the parking system, in various approaches, applies a prediction model to the sensor data that detects characteristics of the parked vehicle itself along with, for example, objects (e.g., people, bags, strollers, etc.) that are proximate to the vehicle.

Accordingly, the parking system can analyze the features to derive a status of the parked vehicle. By way of example, the parking system may identify a person proximate to an open trunk of the parked vehicle and actions of the person, such as placing bags into the trunk. The parking system uses this information to assess whether the vehicle is leaving or staying and to estimate a time until the vehicle will leave. Thus, in the case of someone simply putting items into the trunk, the parking system identifies the vehicle as leaving within the next one to three minutes. By contrast, in the case where the parking system identifies reversing lights as being active on the vehicle, the time to departure may be less than one minute unless there is a mitigating action that is also identified, such as another vehicle present with a turn signal active toward the parking space. The parking system uses the extracted features as contextual indicators of potential movements of the vehicle in relation to departing or staying in the space. Thus, the parking system can then define the status (e.g., staying or departing) along with an estimate of the departing time.

Moreover, the vehicle, in various arrangements, functions in cooperation with a cloud-based system to communicate the information about upcoming available spaces and to coordinate further monitoring. For example, the parking system communicates the status of a parked vehicle to the cloud-based system. Thereafter, the cloud-based system can leverage the information to inform other vehicles that are searching for parking about potentially available spaces and times when the spaces may become available. Additionally, to further support the determination of the availability information, the cloud may route vehicles proximate to a parked vehicle that is predicted to be departing to update the availability information and confirm the status of the parked vehicle, which may be further applied to improve the prediction model. In this way, the parking system improves the identification of available parking by extracting additional contextual information to infer whether a parked vehicle is likely to depart.

In one embodiment, a parking system for improving the identification of available parking spaces is disclosed. The parking system includes one or more processors and a memory communicably coupled to the one or more processors. The memory stores a control module including instructions that, when executed by the one or more processors, cause the one or more processors to, responsive to acquiring sensor data about a surrounding environment including at least one parked vehicle, extract a feature from the sensor data about a context of the parked vehicle. The control module includes instructions to analyze the feature to determine a status of the parked vehicle in relation to whether the parked vehicle is remaining parked. The control module includes instructions to provide the status to inform additional vehicles about an availability of a parking spot of the parked vehicle.

In one embodiment, a non-transitory computer-readable medium for improving identification of available parking spaces and including instructions that, when executed by one or more processors, cause the one or more processors to perform one or more functions is disclosed. The instructions include instructions to, responsive to acquiring sensor data about a surrounding environment including at least one parked vehicle, extract a feature from the sensor data about a context of the parked vehicle. The instructions include instructions to analyze the feature to determine a status of the parked vehicle in relation to whether the parked vehicle is remaining parked. The instructions include instructions to provide the status to inform additional vehicles about an availability of a parking spot of the parked vehicle.

In one embodiment, a method is disclosed. In one embodiment, the method includes, responsive to acquiring sensor data about a surrounding environment including at least one parked vehicle, extracting a feature from the sensor data about a context of the parked vehicle. The method includes analyzing the feature to determine a status of the parked vehicle in relation to whether the parked vehicle is remaining parked. The method includes providing the status to inform additional vehicles about an availability of a parking spot of the parked vehicle.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements, or multiple elements may be designed as one element. In some embodiments, an element shown as an internal component of another element may be implemented as an external component and vice versa. Furthermore, elements may not be drawn to scale.

DETAILED DESCRIPTION

Figure 1:
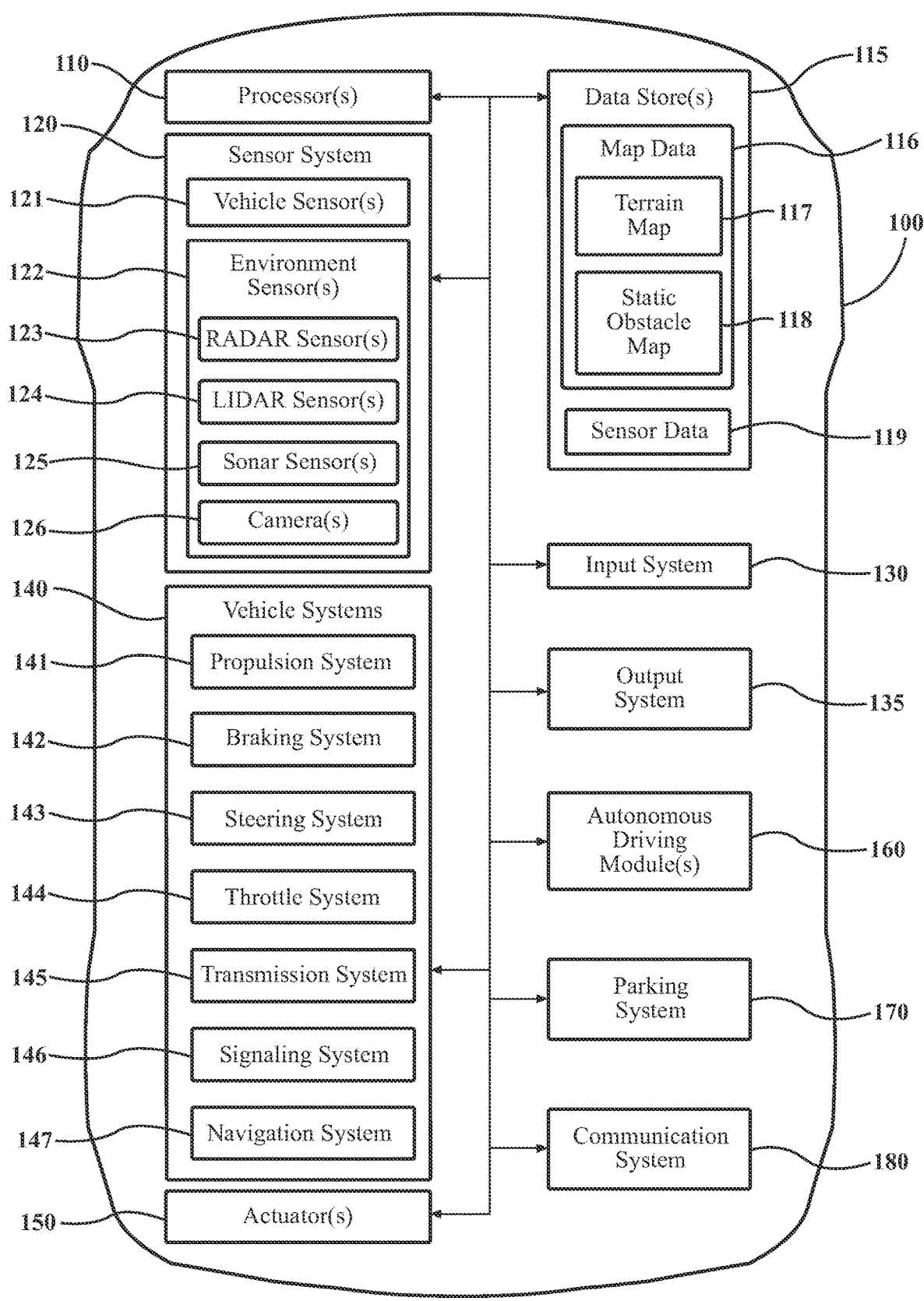
FIG. 1 illustrates one embodiment of a vehicle within which systems and methods disclosed herein may be implemented.

Systems, methods, and other embodiments associated with a manner of improving the identification of available parking spaces by inferring when a vehicle is likely to depart are disclosed. As previously noted, locating parking can be a time-consuming task that can result in delays and frustration for the driver when attempting to locate available spaces within a busy location. While some connected vehicles can scan parking areas and identify available parking spots this information is generally limited to spots that are presently open. Accordingly, in a heavily congested parking lot/ garage, information about available spots may provide little useful information since so few may be available and are often taken quickly.

Therefore, in one or more embodiments, an inventive approach improves the identification of potentially available parking spaces by inferring when a vehicle may leave according to contextual indicators. For example, in at least one arrangement, a parking system acquires sensor data as a vehicle travels through a parking garage. The vehicle may be a vehicle that is itself searching for parking or is simply providing monitoring functionality for available spaces as a secondary task of navigating to a destination. In either case, the vehicle collects the sensor data about the surrounding environment. From the sensor data, the parking system identifies a parked vehicle and extracts features about the parked vehicle. The features include, in at least one approach, contextual indicators that provide insights about whether the parked vehicle is likely to move. For example, the parking system, in various approaches, applies a prediction model to the sensor data. The prediction model is, in various arrangements, a machine learning algorithm, such as a deep neural network (DNN) that performs at least object detection, and classification. Accordingly, the parking system applies the prediction model to detect characteristics of the parked vehicle itself along with, for example, objects (e.g., people, bags, strollers, etc.) that are proximate to the vehicle.

The parking system can analyze the features using further aspects of the prediction model or through additional analysis by, for example, a heuristic. In any case, the parking system derives a status of the parked vehicle to indicate whether the vehicle is departing. By way of example, the parking system may identify a person proximate to an open trunk of the parked vehicle and actions of the person, such as placing bags into the trunk. The parking system uses this information to assess whether the vehicle is leaving or staying and to estimate a time until the vehicle will leave. Thus, in the case of someone simply putting items into the trunk, the parking system identifies a configuration of the vehicle (i.e., with a trunk open) and actions of the person to assess the status, which may then indicate the vehicle is departing and a timeline of 1-3 minutes. By contrast, in the case where the parking system identifies active reversing lights on the vehicle, the time to departure may be less than one minute unless there is a mitigating action that is also identified, such as another vehicle present with a turn signal active toward the parking space. The parking system uses the extracted features as contextual indicators of potential movements of the vehicle in relation to departing or staying in the space. Thus, the parking system can then define the status (e.g., staying or departing) along with an estimate of the departing time.

Moreover, the vehicle, in various arrangements, functions in cooperation with a cloud-based system to communicate the information about upcoming available spaces and to coordinate further monitoring. For example, the parking system communicates the status of a parked vehicle to the cloud-based system. Thereafter, the cloud-based system can leverage the information to inform other vehicles that are searching for parking about potentially available spaces and times when the spaces may become available. Additionally, to further support the determination of the availability information, the cloud may route vehicles proximate to a parked vehicle that is predicted to be departing to update the availability information and confirm the status of the parked vehicle, which may be further applied to improve the prediction model. In this way, the parking system improves the identification of available parking by extracting additional contextual information to infer whether a parked vehicle is likely to depart.

Referring to FIG. 1, an example of a vehicle 100 is illustrated. As used herein, a "vehicle" is any form of powered transport. In one or more implementations, the vehicle 100 is an automobile. While arrangements will be described herein with respect to automobiles, it will be understood that embodiments are not limited to automobiles. In some implementations, the vehicle 100 may be any device that, for example, transports passengers. In various approaches, the vehicle 100 may be an automated vehicle. As used herein, an automated vehicle refers to a vehicle with at least some automated driving functions. Thus, the vehicle 100 may operate autonomously, semi-autonomously, or with the assistance of various advanced driving assistance systems (ADAS). Further, the vehicle 100 is generally a connected vehicle that is capable of communicating wirelessly with other devices, such as other connected vehicles, infrastructure elements (e.g., roadside units), cloud-computing elements, and so on. Moreover, while the present disclosure is generally described in relation to the vehicle 100, in yet further approaches, the noted systems and methods disclosed herein may be implemented as part of other entities, such as electronic devices that are not associated with a particular form of transport but are instead embedded as part of a mobile electronic device that can be, for example, carried by an individual and that may function independently or in concert with additional systems (e.g., sensors) of other devices.

In any case, the vehicle 100 also includes various elements. It will be understood that, in various embodiments, it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances. For example, as discussed, one or more components of the disclosed system can be implemented within the vehicle 100, while further components of the system are implemented within a cloud-based environment, as discussed further subsequently.

Some of the possible elements of the vehicle 100 are shown in FIG. 1 and will be described along with subsequent figures. However, a description of many of the elements in FIG. 1 will be provided after the discussion of FIGS. 2-9 for purposes of the brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements. In any case, as illustrated in the embodiment of FIG. 1, the vehicle 100 includes a parking system 170 that is implemented to perform methods and other functions as disclosed herein relating to inferring when a vehicle is likely to depart in order to identify likely available parking spaces.

Moreover, the parking system 170, as provided for within the vehicle 100, functions in cooperation with a communication system 180. In one embodiment, the communication system 180 communicates according to one or more communication standards. For example, the communication system 180 can include multiple different antennas/transceivers and/or other hardware elements for communicating at different frequencies and according to respective protocols. The communication system 180, in one arrangement, communicates via a communication protocol, such as a WiFi, DSRC, V2I, V2V, Vehicle-to-Cloud (V2C) or another suitable protocol for communicating between the vehicle 100 and other entities in the cloud environment. Moreover, the communication system 180, in one arrangement, further communicates according to a protocol, such as global system for mobile communication (GSM), Enhanced Data Rates for GSM Evolution (EDGE), Long-Term Evolution (LTE), 5G, or another communication technology that provides for the vehicle 100 communicating with various remote devices (e.g., a cloud-based server). In any case, the parking system 170 can leverage various wireless communication technologies to provide communications to other entities, such as members of the cloud-computing environment.

Figure 2:
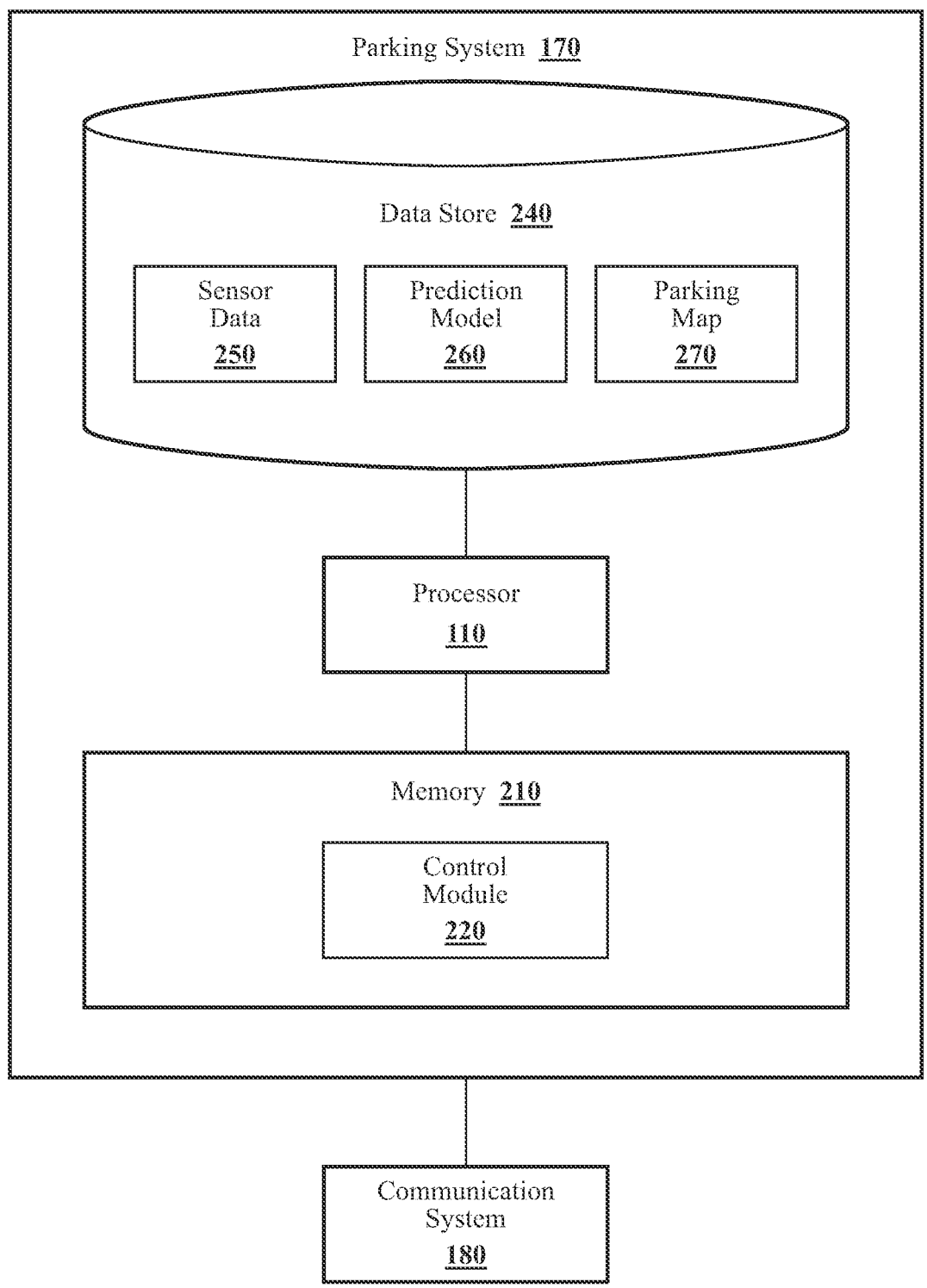
FIG. 2 illustrates one embodiment of a parking system associated with improving the identification of available parking spaces by inferring a parking status of a parked vehicle.

With reference to FIG. 2, one embodiment of the parking system 170 is further illustrated. The parking system 170 is shown as including a processor 110 from the vehicle 100 of FIG. 1. Accordingly, the processor 110 may be a part of the parking system 170, the parking system 170 may include a separate processor from the processor 110 of the vehicle 100 or the parking system 170 may access the processor 110 through a data bus or another communication path. In further aspects, the processor 110 is a cloud-based resource. Thus, the processor 110 may communicate with the parking system 170 through a communication network or may be co-located with the parking system 170. In one embodiment, the parking system 170 includes a memory 210 that stores a control module 220. The memory 210 is a random-access memory (RAM), read-only memory (ROM), a hard-disk drive, a flash memory, or other suitable memory (either volatile or non-volatile) for storing the module 220 and/or other information used by the parking system 170. The module 220 is, for example, computer-readable instructions within the physical memory 210 that, when executed by the processor 110, cause the processor 110 to perform the various functions disclosed herein.

Figure 3:
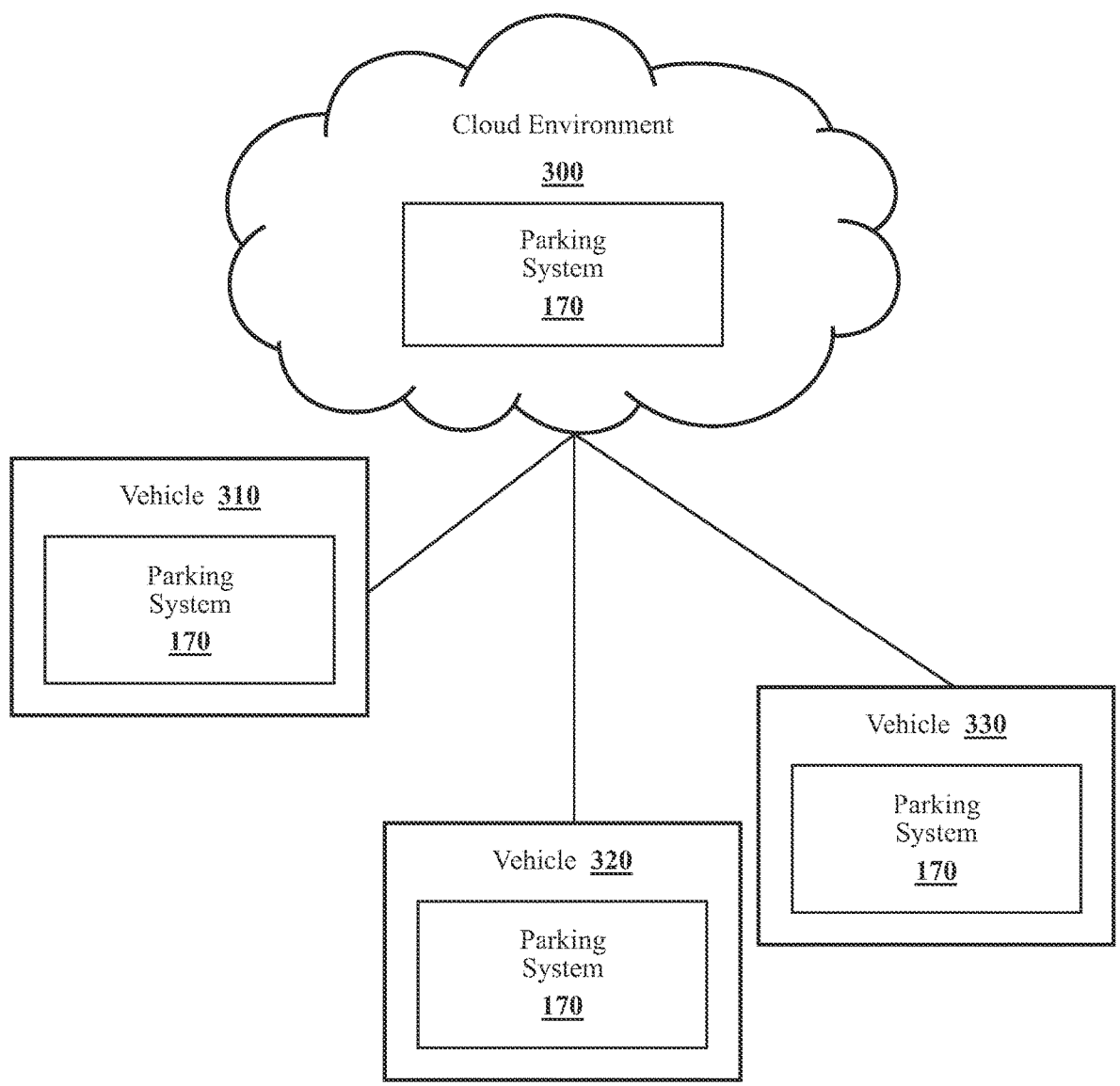
FIG. 3 illustrates a diagram of a parking system within a cloud-computing environment.

As previously noted, the parking system 170 may be further implemented within the vehicle 100 as part of a cloud-based system that functions within a cloud environment 300, as illustrated in relation to FIG. 3. That is, for example, the parking system 170 may acquire data (e.g., telematics data, sensor data, etc.) from various entities, such as distributed vehicles implementing separate instances of the parking system 170. In one or more approaches, the cloud environment 300 may facilitate communications between multiple different vehicles to acquire and distribute information regarding available parking as may be collected by one or more of the vehicles 310, 320, and 330 and disseminated to various vehicles seeking parking.

Accordingly, as shown, the parking system 170 may include separate instances within one or more entities of the cloud-based environment 300, such as servers, and also instances within vehicles that function cooperatively to acquire, analyze, and distribute the noted information. In a further aspect, the entities that implement the parking system 170 within the cloud-based environment 300 may vary beyond transportation-related devices and encompass mobile devices (e.g., smartphones), and other such devices that may be carried by an individual within a vehicle, and thereby can function in cooperation with the vehicle. Thus, the set of entities that function in coordination with the cloud environment 300 may be varied.

The cloud-based environment 300 itself, as previously noted, is a dynamic environment that comprises cloud members that are routinely migrating into and out of a geographic area. In general, the geographic area, as discussed herein, is associated with a broad area, such as a city and surrounding suburbs. As will be discussed in greater detail subsequently, the parking system 170, in at least one arrangement, monitors particular locations associated with parking and may divide the geographic area into regions and aggregates information received from vehicles according to region. In any case, the area associated with the cloud environment 300 can vary according to a particular implementation but generally extends across a wide geographic area.

Continuing with FIG. 2 and a general embodiment of the parking system 170, in one or more arrangements, the parking system 170 includes a data store 240. The data store 240 is, in one embodiment, an electronic data structure (e.g., a database) stored in the memory 210 or another electronic memory and that is configured with routines that can be executed by the processor 110 for analyzing stored data, providing stored data, organizing stored data, and so on. Thus, in one embodiment, the data store 240 stores data used by the module 220 in executing various functions. In one embodiment, the data store 240 includes the sensor data 250, a prediction model 260, a parking map 270, and/or other information that is used by the module 220. It should be appreciated that while the data store 240 is shown as including the sensor data 250, the prediction model 260, and the parking map 270, separate instances of the parking system 170 may implement the data store 240 to include different sets of information.

In any case, the control module 220 includes instructions that function to control the processor 110 to acquire the sensor data 250 about a surrounding environment of the vehicle 100. It should be appreciated that the control module 220 acquires the sensor data 250 when serving in various different capacities within an area of parking (e.g., a parking garage, a parking lot, etc.). That is, the vehicle 100 may itself be seeking parking or may be simply navigating through the area after parking or on the way to another destination. In any case, the parking system 170 capture observations of the surrounding environment in the form of the sensor data 250 that the parking system 170 processes into determinations about parking availability.

Accordingly, the control module 220 generally includes instructions that cause the processor 110 to control one or more sensors of the vehicle 100 to generate an observation about the surrounding environment. Broadly, an observation, as acquired by the control module 220, is information about a particular driving environment (e.g., parking lot, roadway, etc.) and objects present in the driving environment as perceived by at least one sensor. Thus, the observation is generally a group of one or more data that are processed into a meaningful form.

The control module 220, in one embodiment, controls respective sensors of the vehicle 100 to provide the data inputs in the form of the sensor data 250. The control module 220 may further process the sensor data 250 into separate observations of the surrounding environment. For example, the control module 220, in one approach, fuses data from separate sensors to provide an observation about a particular aspect of the surrounding environment. By way of example, the sensor data 250 itself, in one or more approaches, may take the form of separate images, radar returns, LiDAR returns, and so on. The control module 220 may derive determinations (e.g., location, pose, characteristics, etc.) from the sensor data 250 and fuse the data for separately identified aspects of the surrounding environment, such as surrounding vehicles, pedestrians, and so on. The control module 220 may further extrapolate the sensor data 250 into an observation by, for example, correlating the separate instances of sensor data into a meaningful observation about an object beyond an instantaneous data point. For example, the control module 220 may track a pedestrian over many data points to provide an indication of actions in relation to various objects, such as a vehicle, a shopping cart, etc. to provide information about whether a vehicle is leaving a parking space.

Additionally, while the control module 220 is discussed as controlling the various sensors to provide the sensor data 250, in one or more embodiments, the module 220 can employ other techniques that are either active or passive to acquire the sensor data 250. For example, the control module 220 may passively sniff the sensor data 250 from a stream of electronic information provided by the various sensors or other modules/systems in the vehicle 100 to further components within the vehicle 100. Moreover, as noted, the control module 220 can undertake various approaches to fuse data from multiple sensors when providing the sensor data 250. Thus, the sensor data 250, in one embodiment, represents a combination of perceptions acquired from multiple sensors.

Of course, depending on the sensors that the vehicle 100 or other entity includes, the available sensor data 250 that the parking system 170 can harvest may vary. As one example, according to a particular implementation, the vehicle 100 may include different types of cameras or placements of multiple cameras. When acquiring the sensor data 250, the control module 220 may acquire various electronic inputs that originate from the vehicle 100, which may be stored in the data store 240 of the parking system 170 as the sensor data 250 and processed according to various algorithms, such as machine learning algorithms, heuristics, and so on. Accordingly, the parking system 170, in one approach, uses the noted sensor data 250 along with perceptions derived from the sensor data 250 to identify locations of available parking along streets, and within parking facilities.

For example, in various implementations, the control module 220 includes instructions to analyze the sensor data 250 to identify parked vehicles and a context of the parked vehicles. In at least one arrangement, the control module 220 applies the prediction model 260 analyzes the sensor data 250 to provide inferences about the features in relation to whether the vehicle is departing. The prediction model 260 is one or more machine learning algorithms that perform object detection, classification, pose analysis, and so on. The prediction model 260, in further arrangements, also includes additional components or another sub-model that accepts outputs about objects and determines whether the vehicle is departing according to the combination of features. The prediction model 260 may provide further information, including a predicted time to departure.

In general, the form of the prediction model 260 may vary according to a particular implementation. For example, the prediction model 260 may be a single end-to-end network comprised of multiple different output heads, a variety of distinct sub-models, and so on. The particular form of the model(s) may also vary and may include convolutional networks, recurrent networks, generative networks, and so on. Furthermore, a process for training the prediction model 260 may involve reinforcement learning, supervised learning, and so on. In particular, the parking system 170 may acquire the sensor data 250 upon an initial observation of an environment and then subsequently at a later time, which the parking system 170 can leverage to confirm a prediction as a ground-truth that may also serve to further train the prediction model 260.

In general, the control module 220 is applying the prediction model 260 to extract features from the sensor data 250 that identify characteristics of parked vehicles, types of objects proximate to the vehicles, actions associated with people proximate to the vehicles, and so on. The features may be intrinsic features (e.g., human pose, actions, etc.) and extrinsic features (e.g., car key points indicating different configurations of doors, navigation information from a parked vehicle, etc.). By way of example, the characteristics of the parked vehicles can include whether lights of the vehicles are presently active (e.g., brake lights, reverse lights, running lights, etc.), whether one or more doors/compartments of the vehicle are open (e.g., a trunk, a hatch, a sunroof, a side door, etc.), and so on. The types of objects generally include, for example, the presence of strollers, shopping carts, bicycles, shopping bags, and other items that influence an amount of time spent by a driver passenger interacting with the vehicle before leaving (e.g., cargo). The actions associated with people proximate to the vehicle may involve loading cargo/items into the vehicle, loading children into the vehicle, entering/exiting the vehicle, and so on. As a further example in which the parked vehicle is also a connected vehicle (e.g., communicates with the cloud-based environment 300 or directly with the vehicle 100), the parked vehicle itself can provide information about a current parking state (e.g., parked vs about to depart). For example, as the parked vehicle reaches the destination and parks, the parked vehicle may convey information about a specific destination (e.g., which store) or simply that the vehicle has parked and occupied a particular parking space. This information can be extrapolate into a likely time that the vehicle will remain parked and thus indicates a potential subsequent departure. Moreover, the parked vehicle can provide information about a potential departure directly, such as when the parked vehicle is about to leave and a driver enters a destination into the navigation system, thereby indicating departure within a likely window of less than a minute. Thus, the features are generally elements associated with interacting with the vehicle that are associated with identifying an amount of time until the vehicle departs.

Overall, the extracted features are contextual indicators that define a context of a particular vehicle. Accordingly, the control module 220 uses the extracted features to extrapolate a likely departing time from which the control module 220 can further determine a status of the parked vehicle. In one approach, the control module 220 implements, as previously noted, a machine learning algorithm that derives the features from the sensor data 250 and also indicates a likely time until departure (e.g., 5 mins) by considering the combination of the features. The derived determination can be provided as a status of the vehicle in a particular parking space that is then provided to other vehicles and/or a driver of the instant vehicle 100 to specify whether the vehicle is departing.

In further approaches, the control module 220 implements a heuristic to determine the status from the extracted features. For example, the prediction model 260 extracts the features (e.g., person placing bags into open trunk), and the control module 220 analyzes the combination of features to generate knowledge in the form of a binary determination of whether the vehicle is leaving or not, which is the status of the parked vehicle. In further approaches, the control module 220 may also provide a predicted departure time according to the identified features. Thus, the control module 220 may attribute a different weight to different features, which in summation provide for the note departure time. Of course, as also noted, the prediction model 260 can provide the determination of departure and the time as an end-to-end determination.

As a further aspect, the control module 220 considers additional information when making the determination of whether the parked vehicle is leaving and the predicted departure time. The additional information includes, in one configuration, environmental factors that broadly influence the activities of individuals. For example, the additional information may include a time of day, a day of a year, and a type of a location associated with the parking spot. The control module 220 considers this information when assessing the extracted features and determining a likely departure time. For example, depending on the time of year (e.g., winter versus summer), people may be quicker with getting into a vehicle and leaving because of severe weather. Similarly, the days of the week and type of location can also factor into whether a person is departing and a time until they depart. As one example, during a workday when a vehicle is parked at a coffee shop, a driver may be much quicker to return to a vehicle and leave as opposed to a weekend morning at a similar location. In this way, the parking system 170 assesses potential departures of vehicles using contextual indicators to improve the identification of parking spaces that may soon become available.

As an additional aspect of the parking system 170, the control module 220, in one or more arrangements, also analyzes the sensor data 250 for mitigating factors that may influence the availability of a parking space associated with a parked vehicle. For example, the control module 220 can apply the prediction model 260 or another machine-learning algorithm to further identify other vehicles in the surrounding environment. In one example, the control module 220 identifies when another vehicle that is not parked is proximate to the parked vehicle. Identifying the additional vehicle can further include identifying characteristics of the vehicle, such as whether the vehicle has turn blinkers active, is moving, is sitting still, and so on. Other mitigating factors can include particular actions of individuals associated with the parked vehicle, such as a person removing an item from the vehicle (e.g., removing a bag from a trunk), and so on. In general, the mitigating factors identify actions associated with the vehicle remaining parked (i.e., a person returning to the vehicle but then leaving again without moving the vehicle) or another vehicle that is likely to occupy the soon to be available space.

The parking system 170 can then communicate the derived observations derived to the cloud-based environment 300 for dissemination back to vehicles that are presently seeking parking. The cloud-based environment 300 may also provide instructions to various connected vehicles to improve knowledge about available parking spaces, such as re-routing vehicles to observe particular areas (e.g., where soon-to-be departing vehicles were previously observed, etc.). As such, the parking system 170 is better able to direct vehicles to locations of potentially available spaces in highly congested parking areas and/or provide additional contextual clues to the driver so that the driver can make decisions on whether to wait for a parked vehicle to park or continue searching for a parking space.

Figure 4:
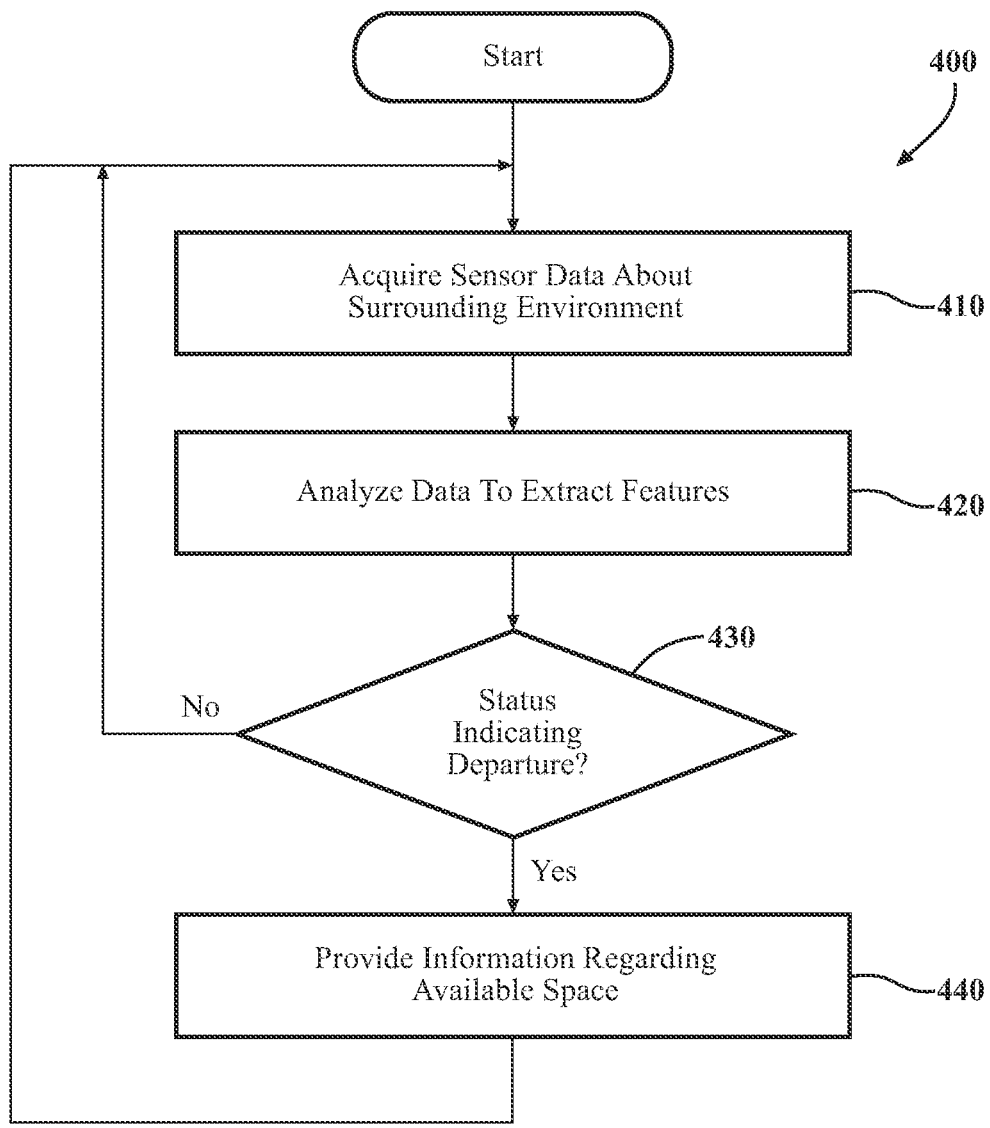
FIG. 4 is a flowchart illustrating one embodiment of a method associated with processing sensor data to determine whether a parked vehicle is about to depart.

Additional aspects about inferring the availability of parking spaces will be described in relation to FIG. 4. FIG. 4 illustrates a flowchart of a method 400 that is associated with analyzing sensor data to identify whether a parked vehicle is departing. Method 400 will be discussed from the perspective of the parking system 170 of FIGS. 1-2 as implemented by an entity, such as a vehicle that may be in communication within the cloud-based environment 300. While method 400 is discussed in combination with the parking system 170, it should be appreciated that the method 400 is not limited to being implemented within the parking system 170 but is instead one example of a system that may implement the method 400. Furthermore, while the method is illustrated as a generally serial process, various aspects of the method 400 can execute in parallel to perform the noted functions.

As an initial matter about the operation of the parking system 170, prior to initiating parking, the parking system 170 may acquire the prediction model 260. For example, as one approach, the parking system 170 can monitor a location of the vehicle 100 and acquire a location-specific version of the prediction model 260 according to an area in which the vehicle 100 is to park. Thus, when the vehicle 100 approaches or enters a parking lot, parking garage, or a general area of parking, the parking system 170 can acquire a version of the prediction model 260 from, for example, the cloud environment 300. Thus, the prediction model 260 may be trained according to specifics of a location in which the vehicle 100 is seeking parking such that predictions are customized to more common aspects of the location (e.g., shopping versus a hospital).

Moreover, in various approaches, the parking system 170 may, additionally or alternatively, acquire a departure indicator database when the vehicle 100 approaches an area of parking. The departure indicator database includes, in one arrangement, information about different features that the control module 220 may extract and how the features relate to whether the vehicle is departing or not. For example, in one approach, the departure indicator database includes indicators associated with different features that specify whether the feature relates to a departure or not. In some implementations, the departure indicator database may provide weights associated with the different features so that the control module 220 can calculate a likelihood of departure according to the aggregated features. In yet further implementations, the departure indicator database also includes departure times associated with the different features. That is, each separate feature that the departure indicator database includes also includes an associated time until departure associated with the presence of the feature. For example, reversing lights may specify a time of one minute, whereas the presence of a stroller may indicate 5 minutes, which, of course, may vary according to specifics of the location. Accordingly, it should be appreciated that the following discussion of the method 400 occurs using the information (e.g., departure indicator DB, prediction model 260) that the parking system 170 may acquire upon entering a particular parking area.

At 410, the control module 220 acquires the sensor data 250 about a surrounding environment. It should be appreciated that acquiring the sensor data 250, while shown as a single discrete instance, generally occurs as a series of observations over time. In this way, the control module 220 is able to capture movements/actions in addition to instantaneous observations. In any case, the sensor data 250 is information from sensors of the vehicle 100 that embodies an area around the vehicle 100. Of course, in further aspects, the sensor data 250 may also include information from other devices, including other vehicles, infrastructure devices, and so on that the parking system 170 acquires via wireless communications (e.g., V2X).

At 420, the control module 220 extracts a feature from the sensor data 250 about a context of a parked vehicle. That is, the control module 220 processes the sensor data 250 and initially identifies at least one parked vehicle. In practice, the control module 220 is identifying a plurality of different parked vehicles. However, the discussion will focus on a single parked vehicle to simplify the discussion. In any case, the control module 220 uses the prediction model 260 to detect, classify and analyze aspects of the parked vehicle, such as particular features that inform a determination of whether the parked vehicle is departing or remaining parked. Accordingly, the prediction model 260 analyzes an area of the parked vehicle to extract one or more features. As previously set forth, the features generally include intrinsic and extrinsic aspects. The intrinsic aspects relate to, for example, human poses or series of poses and actions associated therewith, while the extrinsics define associated objects and interactions of a human with the objects.

Thus, the features serve as contextual indicators that provide clues about whether the parked vehicle is remaining parked. By way of example but not limitation, the features can include key points of the vehicle, such as whether a door, trunk, frunk, or another compartment of the parked vehicle is presently open, whether windows are opening/closing, whether indicator lights (e.g., running lights, reverse lights, blinkers, etc.) are active, whether an exhaust is emitting fumes, and so on. The features further include the presence of people and objects associated with the people, including strollers, luggage, cargo, and so on. Moreover, the features can also include poses and series of poses of the people that can be extrapolated into particular actions, such as loading cargo, buckling children into the vehicle, changing a diaper of a child, and so on. By identifying the noted features, the control module 220 is better able to infer a status of the parked vehicle.

At 430, the control module 220 analyzes the feature to determine a status of the parked vehicle in relation to whether the vehicle is remaining parked or departing. In at least one arrangement, the control module 220 analyzes the previously identified features to determine whether the features indicate that the parked vehicle is departing and a time until departure. As previously outlined, the determination of the status may be undertaken by the prediction model 260, and thus the prediction model 260 may provide the status and the departure time as part of an output. In further aspects, the control module 220 separately analyzes the features using, for example, a heuristic that accounts for the separate features in addition to other environmental factors and weighs the totality of the circumstances to generate a determination of the status (e.g., departing or remaining parked). The environmental factors may include aspects about the surrounding environment, including a time of day, a day of a year, a type of a location associated with the parking spot, and other factors that generally influence a time spent by a person (e.g., a driver) departing from a parking space.

In addition to identifying the features that are specific to the location in order to adjust the status, the control module 220 also considers the presence of mitigating factors that relate to aspects about the surrounding environment that affect the availability of a parking spot. For example, the mitigating factors can include a delay in the parked vehicle departing and a waiting vehicle replacing the parked vehicle in the parking spot. For example, when the sensor data 250 includes information about a waiting vehicle (i.e., a stopped vehicle in a travel lane) proximate to the parked vehicle, which may also display a turn signal, the control module 220 considers the waiting vehicle to be a mitigating factor that is likely to occupy a space of the parked vehicle upon departing. Another example of a mitigating factor includes a person removing an item from the parked vehicle as opposed to placing an item into the vehicle. Accordingly, the control module 220 can consider multiple different factors, such as environmental aspects and those that mitigate the departure of a parked vehicle when assessing the status.

Moreover, as identified previously, the status, in various approaches, also includes a predicted departure time. The departure time is an estimate of when the parked vehicle is likely to depart from the parking spot. While the prediction model 260 may provide the predicted departure time, in further arrangements, the control module 220 may determine the departure time as part of the status. Accordingly, the control module 220 may derive the departure time according to times assigned to different features in the departure indicator database as weighed according to a heuristic. In any case, the control module 220 can provide estimates of when a parked vehicle is likely to leave according to the observed features.

Thus, when the status indicates that the parked vehicle is not leaving, the parking system 170 repeats the monitoring process as described starting at 410. However, when the status indicates that the parked vehicle is departing, then the control module 220 proceeds to provide the status, as discussed at 440.

At 440, the control module 220 provides the status to inform additional vehicles about an availability of a parking spot of the parked vehicle. In various implementations, the control module 220 may provide the status by communicating the status to a remote device of the cloud-based environment 300. That is, the control module 220 communicates the status to inform the cloud 300 about the availability of parking. The control module 220 may provide the status in the form of the parking map 270 that identifies the status along with the location of the parking space. The cloud-based environment 300 can then coordinate with vehicles that are seeking parking to specify the potential availability and/or with additional vehicles that may be traveling through an area of the parking space in order to further monitor the progress of whether the parked vehicle has departed or not. Accordingly, the cloud-based environment 300 may function to re-route vehicles to pass by a potentially available parking space in order to confirm or refute the availability. Of course, in further approaches, the control module 220 may also specify the status to a driver of the instant vehicle 100 via a human-machine interface (HMI), such as a display within the vehicle 100. In this way, the parking system 170 improves the identification of parking spaces within an area of congested parking activity.

Figure 5:
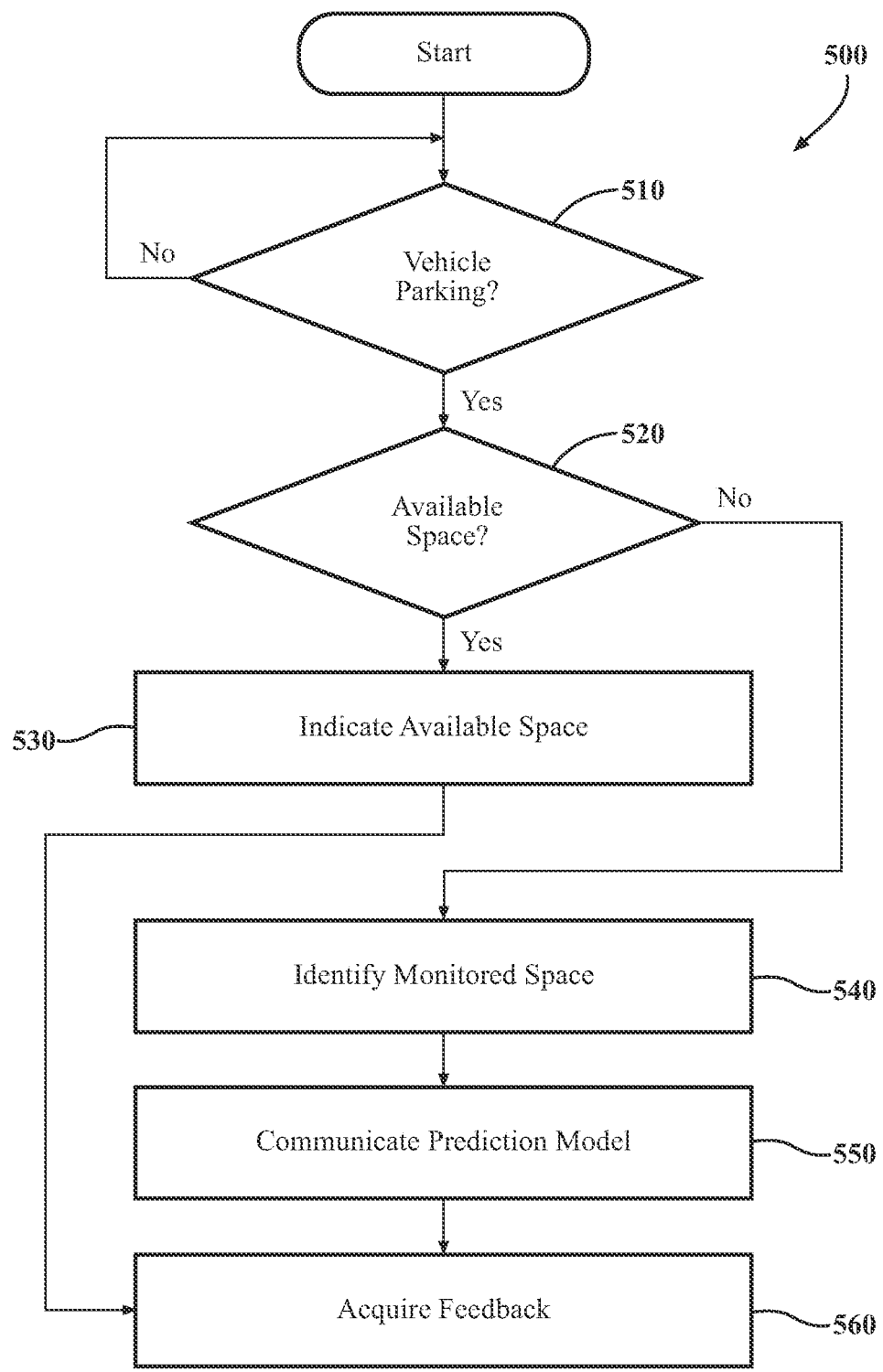
FIG. 5 is a flowchart illustrating one embodiment of cloud-based tracking of available parking spaces.

FIG. 5 illustrates a flowchart of a method 500 that is associated with functions of a cloud-based remote device that supports the parking system 170 within the vehicle 100. Method 500 will be discussed from the perspective of the parking system 170 of FIG. 2, as implemented as a separate instance within the cloud-based environment 300. While method 500 is discussed in combination with the parking system 170, it should be appreciated that the method 500 is not limited to being implemented within the parking system 170 but is instead one example of a system that may implement the method 500. Furthermore, while the method is illustrated as a generally serial process, various aspects of the method 500 can execute in parallel to perform the noted functions.

At 510, the parking system 170 determines whether the vehicle 100 is currently within a parking area as may be defined by the parking map 270 or is specifically requesting knowledge about available parking spaces in, for example, a parking garage or parking lot. The parking system 170 may determine when the vehicle 100 is about to park according to a location, a navigation destination, particular behaviors of the vehicle (e.g., circling an area, stopping/starting, etc.), and so on. Otherwise, the vehicle 100 can generate a specific request for parking information.

At 520, the parking system 170 determines the availability of parking in a location associated with the vehicle 100. If parking is available, then the parking system 170 proceeds to identify available spaces, as discussed at 530. Otherwise, the parking system 170 identifies potentially available spaces, as discussed at 540.

At 530, the parking system 170 indicates to the vehicle 100 locations of one or more available parking spaces. In general, the parking system 170 may reference the parking map 270, which includes the status of separate spaces within an area in which the vehicle 100 is parking. The parking system 170 may then specify a space within the parking map 270 and/or directly communicates the parking map 270 to the vehicle 100 to indicate an available space. In further aspects, the parking system 170 may assign a space and provide a specific route to the space. The parking system 170 may generate the route to cause the vehicle 100 to observe other parking spaces and provide information about the availability of those spaces back to the parking system 170 of the cloud-based environment 300.

Continuing to 540 according to a determination that no spaces are available, the parking system 170 identifies one or more monitored spaces. The monitored spaces are spaces that have been identified by other vehicles as being potentially available according to observations that correspond with an occupying vehicle soon departing. Accordingly, the parking system 170 can communicate the locations of the potentially available spaces to the vehicle 100, and, at 550, further communicates the prediction model 260 that is specific to the location and/or the departure indicator database. In this way, the vehicle 100 can analyze contextual indicators about the parked vehicles and determine when a parking space is likely to become available, thereby improving the process of identifying an available space to park.

At 560, the parking system 170 acquires feedback from the vehicle 100. In one or more arrangements, the feedback includes observations of an area in which the vehicle 100 is parking or is at least passing through that includes parking. Thus, the vehicle 100 generates observations about locations of available spaces, occupied spaces, and potentially available spaces as provided for by extracting the features and analyzing the features to generate the status. Thus, the vehicle 100 may make observations continuously while searching for an available space or when simply navigating through a parking area (e.g., when departing), and provides information about parked vehicles, including predicted departure times, to the cloud-based environment 300 for inclusion in the parking map 270. In this way, the parking system 170 acquires and shares information to improve parking in congested areas.

Figure 6:
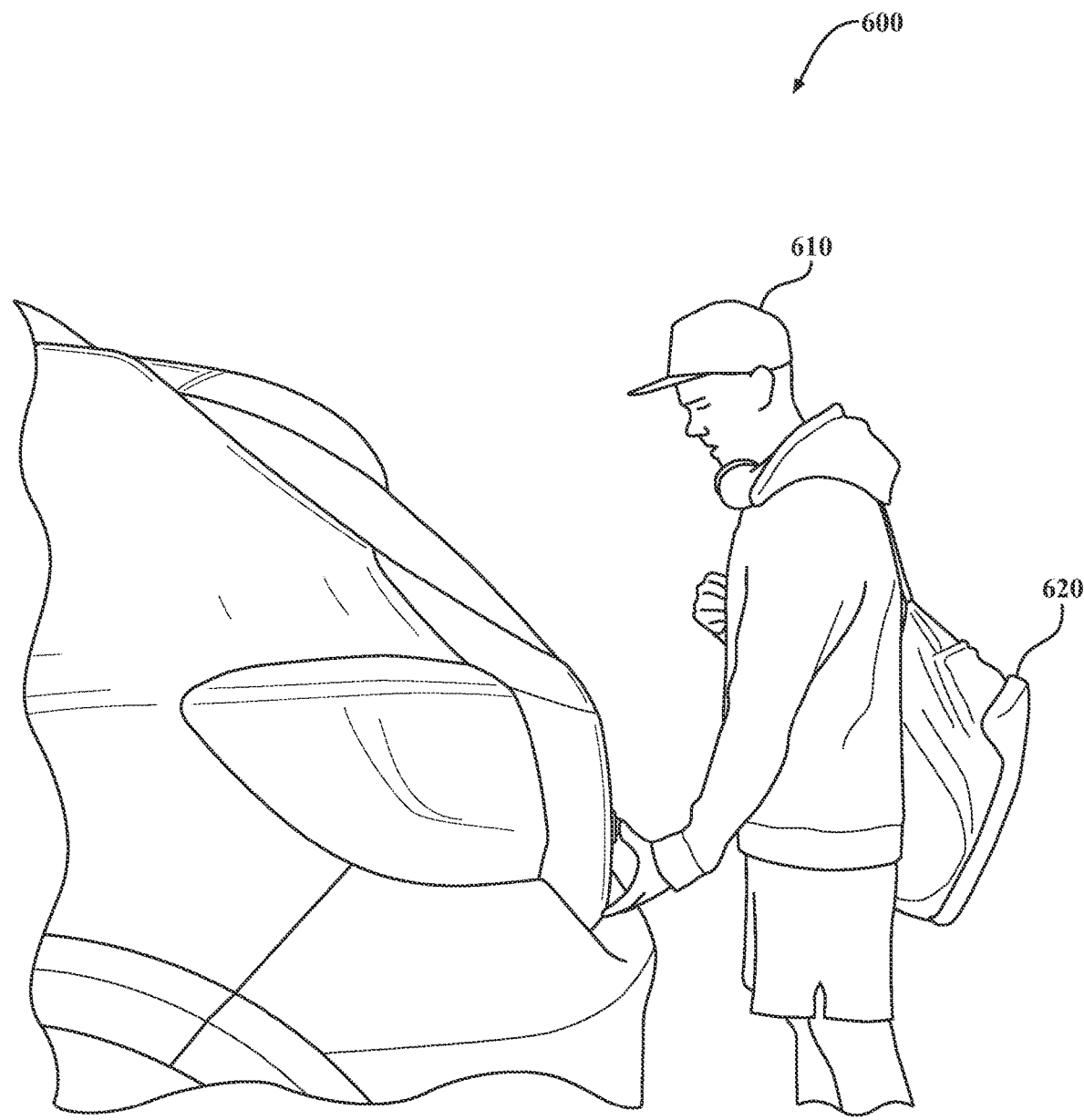
FIG. 6 illustrates an example of a person is interacting with the trunk of a vehicle.
Figure 7:
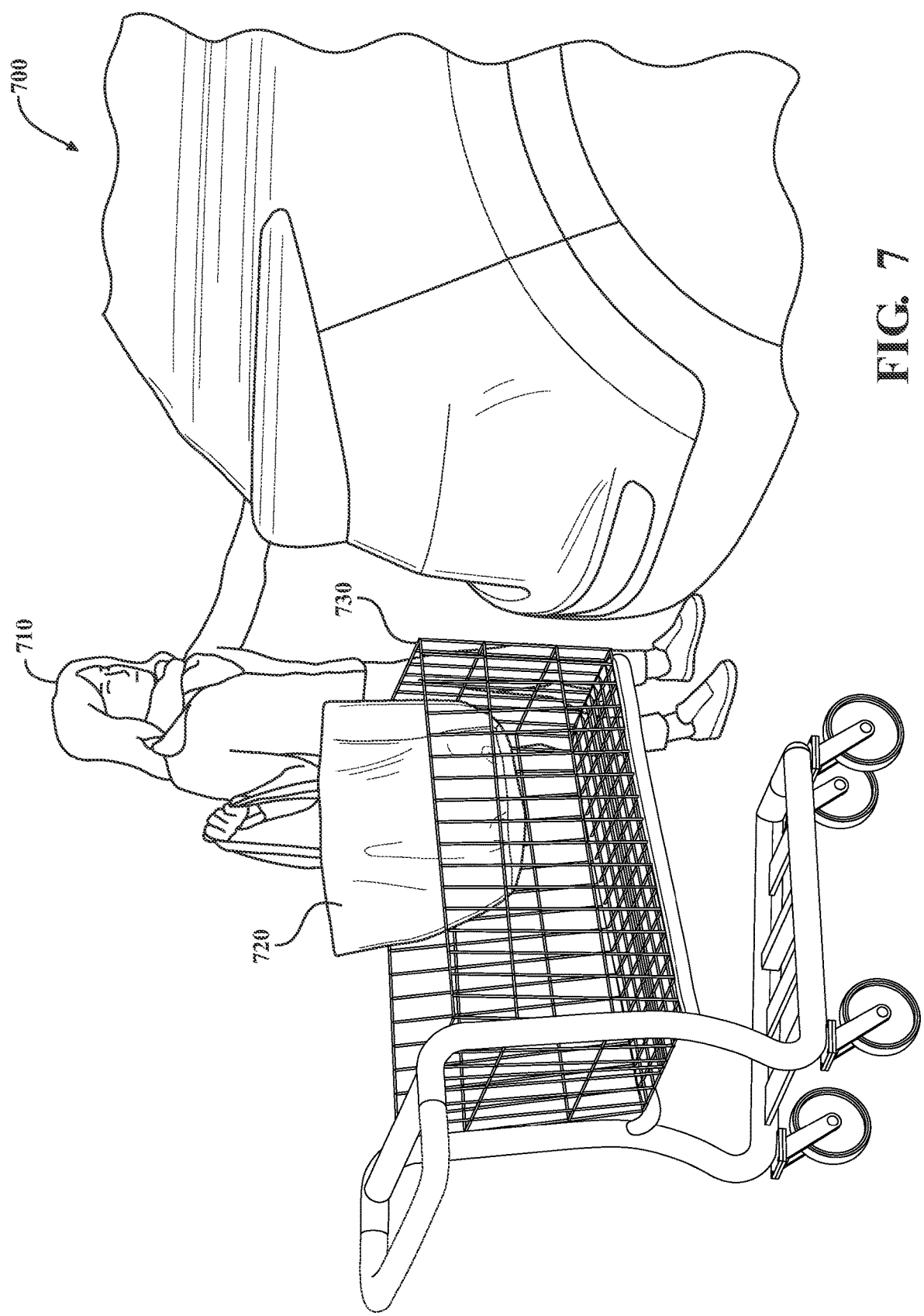
FIG. 7 illustrates an example of a perceived context in which a person is unloading items from a shopping cart into a vehicle.
Figure 8:
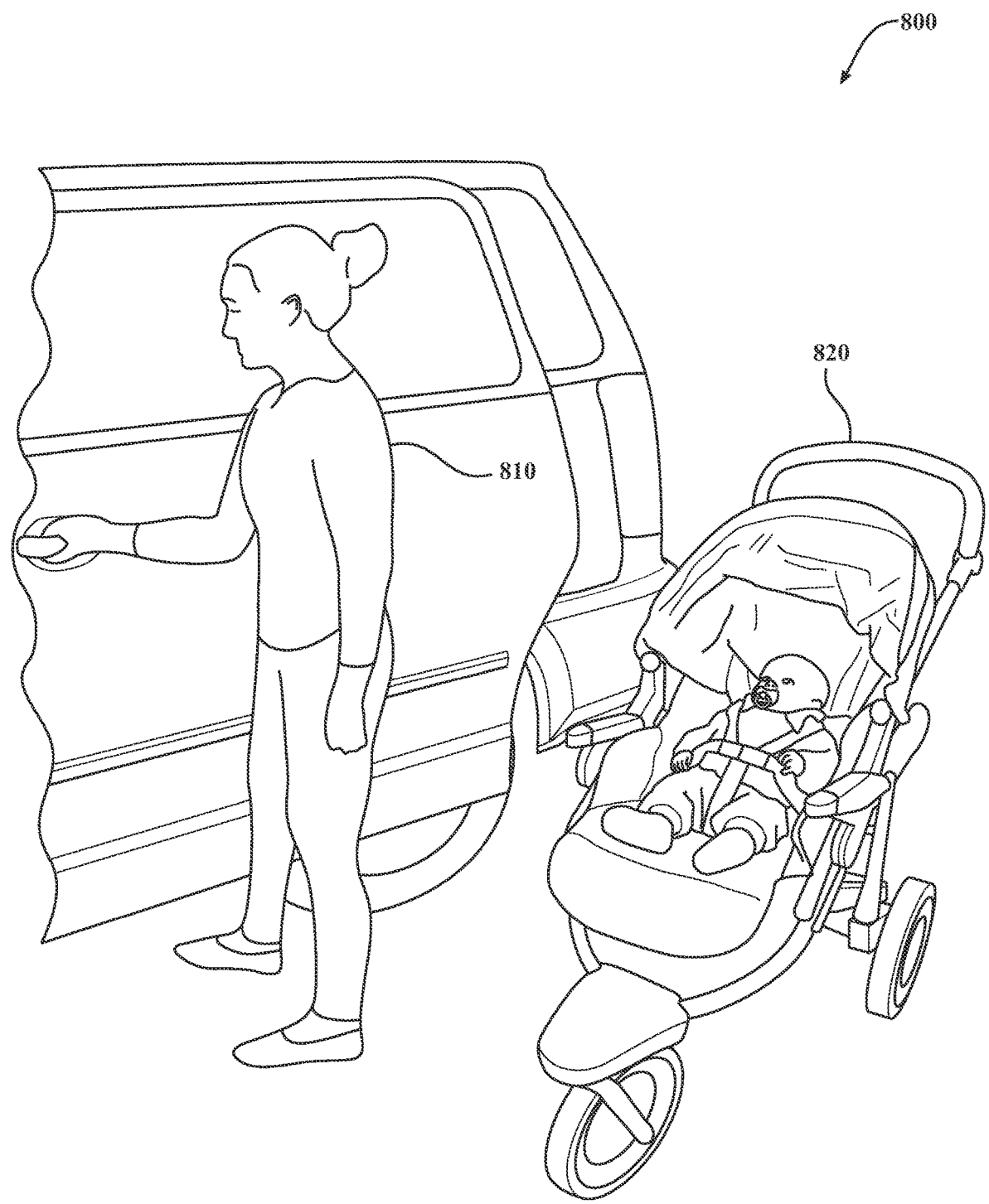
FIG. 8 illustrates an example of a perceived context in which a stroller is parked along proximate to a vehicle.
Figure 9:
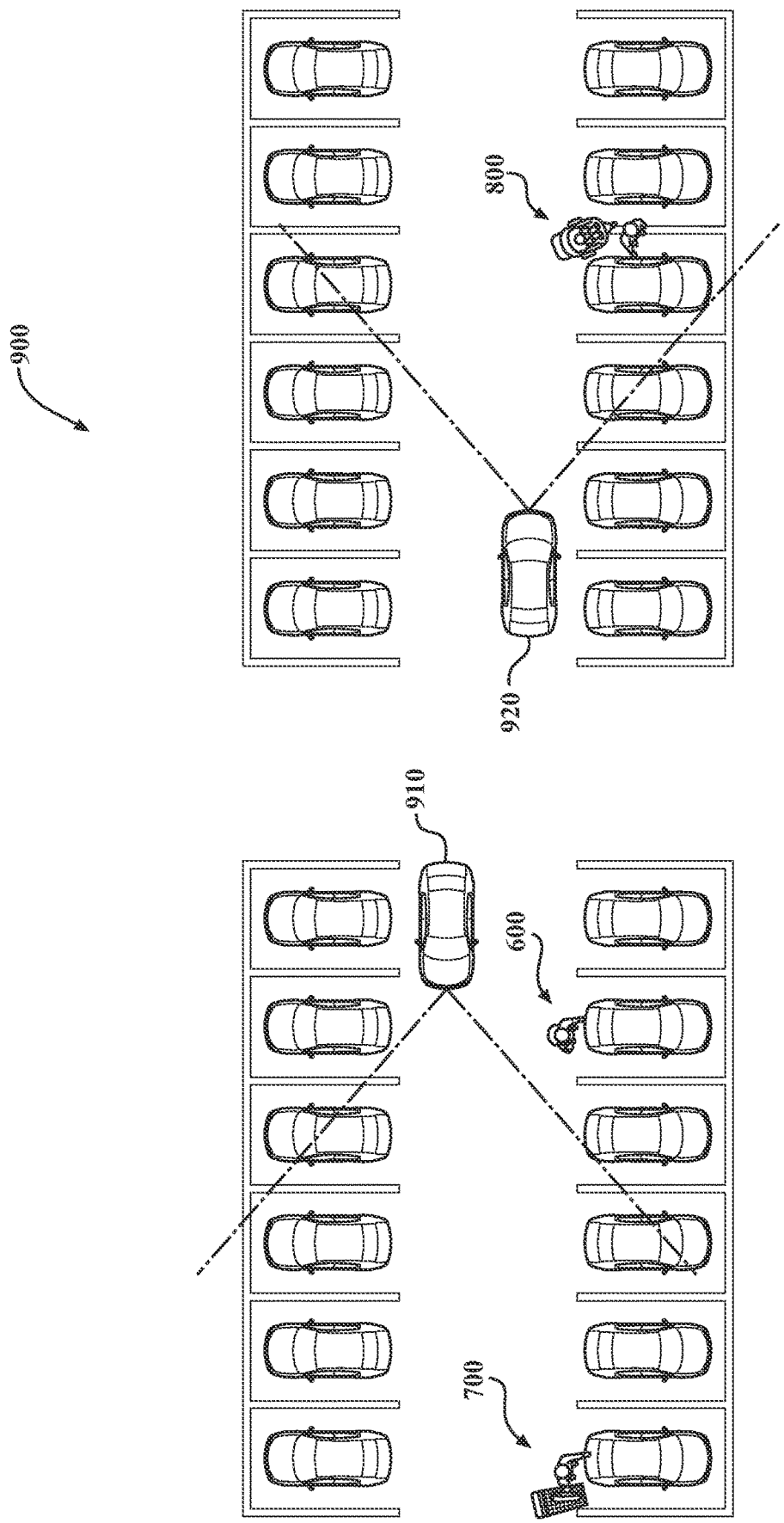
FIG. 9 is an illustration of a parking environment in which the disclosed embodiments may function.

As a further explanation of the parking system 170, reference will now be made to FIGS. 6-9. FIGS. 6-8 illustrate examples of different features and statuses that may be associated with the depicted features while FIG. 9 illustrates an overall example of a parking lot. Accordingly, as shown in FIG. 6, a parked vehicle 600 is depicted with a person 610 carrying a backpack 620. The person is opening a trunk of the vehicle 600. Accordingly, the parking system 170, upon acquiring sensor data observing the noted context, extracts features including the person, the backpack, the trunk, and particular actions of the person in relation to the trunk. As a result, the parking system 170 may derive a determination that the vehicle 600 is departing within the next three minutes. Moreover, a particular context of the location may further adapt the determination of the status, such as if the vehicle 600 is parked at a gym. By contrast, mitigating factors, such as the presence of another vehicle with an active blinker, may result in the status changing.

FIG. 7 illustrates a parked vehicle 700 with a person loading bags 720 from a shopping cart 730. Accordingly, the parking system 170 observes the person 710 and extracts the shopping cart 730, the bags 720, the person 710, and keypoints of the parked vehicle 700 (i.e., the trunk) for analysis. As a result, the parking system 170 determines the status as departing within five minutes. FIG. 8 illustrates a parked vehicle 800. In FIG. 8, a person 810 is opening a door to the vehicle 800 while a stroller 820 with a child is positioned next to the vehicle 800. Accordingly, because the loading of the child and the stroller 820 may take a significant amount of time and the parking system 170 has identified the combination of features, the parking system 170 may derive the status as departing but in a predicted time of five to ten minutes, which is longer than circumstances depicted in other examples, such as FIGS. 7-8.

FIG. 9 illustrates a parking lot 900 that includes two vehicles 910 and 920 seeking parking spaces. However, as shown, the parking lot 900 does not have any free spaces. Accordingly, the parking system 170 of the respective vehicles 910/920 acquire the prediction model 260/departure indicator database that is specific to the parking lot 900 and begin to scan the parked vehicles for contextual indicators about which vehicles may potentially be departing. Accordingly, the vehicle 910 acquires sensor data and identifies vehicles 600 and 700 as potentially departing soon. The vehicle 910 may share this information with the cloud-based environment 300 for dissemination to other vehicles (e.g., vehicle 920) that are seeking parking in the parking lot 900. Similarly, the vehicle 920 observes the vehicle 800 with contextual indicators that result in a determination of a status that the vehicle 800 is departing within ten minutes. Accordingly, the vehicle 920 acquires information about observations from the vehicle 910 via the cloud-based environment 300 and, thus, may choose to move toward another vehicle that is departing (e.g., vehicle 600 or 700) instead of waiting for the extended time for the vehicle 800 to leave. In this way, the parking system 170 improves the identification of available parking and facilitates the quicker location of available spaces.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Of course, in further aspects, the vehicle 100 may be a manually driven vehicle that may or may not include one or more driving assistance systems, such as active cruise control, lane-keeping assistance, crash avoidance, and so on. In any case, "manual mode" means that all of or a majority of the navigation and/or maneuvering of the vehicle is performed according to inputs received from a user (e.g., human driver). In one or more arrangements, the vehicle 100 can be a conventional vehicle that is configured to operate in only a manual mode.

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangements, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such a case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include various types of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras or infrared (IR) cameras.

The vehicle 100 can include an input system 130. An "input system" includes any device, component, system, element, or arrangement or groups thereof that enable information/data to be entered into a machine. The input system 130 can receive an input from a vehicle passenger (e.g., a driver or a passenger). The vehicle 100 can include an output system 135. An "output system" includes any device, component, or arrangement or groups thereof that enable information/data to be presented to a vehicle passenger (e.g., a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system, or a geolocation system.

The processor(s) 110, the parking system 170, and/or the automated driving module(s) 160 can be operatively connected to communicate with the various vehicle systems 140 and/or individual components thereof. For example, returning to FIG. 1, the processor(s) 110 and/or the automated driving module(s) 160 can be in communication to send and/or receive information from the various vehicle systems 140 to control the movement, speed, maneuvering, heading, direction, etc. of the vehicle 100. The processor(s) 110, and/or the automated driving module(s) 160 may control some or all of these vehicle systems 140 and, thus, may be partially or fully autonomous.

The processor(s) 110, and/or the automated driving module(s) 160 can be operatively connected to communicate with the various vehicle systems 140 and/or individual components thereof. For example, returning to FIG. 1, the processor(s) 110, the parking system 170, and/or the automated driving module(s) 160 can be in communication to send and/or receive information from the various vehicle systems 140 to control the movement, speed, maneuvering, heading, direction, etc. of the vehicle 100. The processor(s) 110, the parking system 170, and/or the automated driving module(s) 160 may control some or all of these vehicle systems 140.

The processor(s) 110, and/or the automated driving module(s) 160 may be operable to control the navigation and/or maneuvering of the vehicle 100 by controlling one or more of the vehicle systems 140 and/or components thereof. For instance, when operating in an autonomous mode, the processor(s) 110, and/or the automated driving module(s) 160 can control the direction and/or speed of the vehicle 100. The processor(s) 110, and/or the automated driving module (s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor (s) 110 and/or the automated driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor (s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more automated driving modules 160. The automated driving module(s) 160 can be configured to receive data from the sensor system 120 and/or any other type of system capable of capturing information relating to the vehicle 100 and/or the external environment of the vehicle 100. In one or more arrangements, the automated driving module(s) 160 can use such data to generate one or more driving scene models. The automated driving module(s) 160 can determine the position and velocity of the vehicle 100. The automated driving module(s) 160 can determine the location of obstacles, obstacles, or other environmental features, including traffic signs, trees, shrubs, neighboring vehicles, pedestrians, etc.

The automated driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The automated driving module(s) 160 either independently or in combination with the parking system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source such as determinations from the sensor data. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The automated driving module(s) 160 can be configured to implement determined driving maneuvers. The automated driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The automated driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-9, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product that comprises all the features enabling the implementation of the methods described herein and, when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Generally, modules, as used herein, include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A parking system for improving identification of available parking spaces, comprising:
one or more processors; and
a memory communicably coupled to the one or more processors and storing:
a control module including instructions that when executed by the one or more processors cause the one or more processors to:
responsive to acquiring sensor data about a surrounding environment including at least one parked vehicle, extract a feature from at least an image in the sensor data about a context of the parked vehicle;
analyze the feature to determine a status of the parked vehicle in relation to whether the parked vehicle is remaining parked, including instructions to analyze the feature for whether the feature is an object proximate to the parked vehicle, an action of a person proximate to the parked vehicle, and a characteristic of the parked vehicle, wherein the action includes placing an item into the parked vehicle or removing an item from the vehicle; and provide the status to inform additional vehicles about an availability of a parking spot of the parked vehicle.

2. The parking system of claim 1, wherein the control module includes instructions to analyze the feature including instructions to determine whether the feature indicates that the parked vehicle is departing and a time until departure, and wherein the instructions to extract the feature from the sensor data include instructions to apply a neural network to image data in the sensor data.

3. The parking system of claim 2, wherein the control module includes instructions to determine the time until departure including instructions to consider environmental factors, including a time of day, a day of a year, and a type of a location associated with the parking spot.

4. The parking system of claim 1, wherein the control module includes instructions to extract the feature including instructions to derive the feature as a contextual indicator that provides an inference about whether the parked vehicle is remaining parked by processing the sensor data using a prediction model, wherein the contextual indicator defines at least an action of a person proximate to the parked vehicle, and wherein the control module includes instructions to extract the feature including instructions to identify the action from movements of an object associated with the parked vehicle.

5. The parking system of claim 1, wherein the control module includes instructions to analyze the feature including instructions to determine whether the feature is a mitigating factor that relates to at least one of: a delay in the parked vehicle departing and a waiting vehicle replacing the parked vehicle in the parking spot, and wherein the mitigating factor is associated with the waiting vehicle displaying a turn signal relative to the parking spot, and a person removing an item from the parked vehicle.

6. The parking system of claim 1, wherein the control module includes instructions to provide the status including instructions to communicate the status to at least one of: a remote device to inform additional vehicles about the availability of parking in a location and a driver of a monitoring vehicle.

7. The parking system of claim 1, wherein the control module includes instructions to provide the status including instructions to cause an additional vehicle to route by the parking spot to monitor whether the parked vehicle has departed.

8. The parking system of claim 1, wherein the parking system is integrated within a monitoring vehicle that operates at least partially autonomously.

9. A non-transitory computer-readable medium storing instructions for improving identification of available parking spaces and that, when executed by one or more processors, cause the one or more processors to:

responsive to acquiring sensor data about a surrounding environment including at least one parked vehicle, extract a feature from at least an image in the sensor data about a context of the parked vehicle;

analyze the feature to determine a status of the parked vehicle in relation to whether the parked vehicle is remaining parked, including instructions to analyze the feature for whether the feature is an object proximate to the parked vehicle, an action of a person proximate to the parked vehicle, and a characteristic of the parked vehicle, wherein the action includes placing an item into the parked vehicle or removing an item from the vehicle; and provide the status to inform additional vehicles about an availability of a parking spot of the parked vehicle.

10. The non-transitory computer-readable medium of claim 9, wherein the instructions to analyze the feature include instructions to determine whether the feature indicates that the parked vehicle is departing and a time until departure, and wherein the instructions to extract the feature from the sensor data include instructions to apply a neural network to image data in the sensor data.

11. The non-transitory computer-readable medium of claim 10, wherein the instructions to determine the time until departure include instructions to consider environmental factors, including a time of day, a day of a year, and a type of a location associated with the parking spot.

12. The non-transitory computer-readable medium of claim 9, wherein the instructions to extract the feature include instructions to derive the feature as a contextual indicator that provides an inference about whether the parked vehicle is remaining parked by processing the sensor data using a prediction model, wherein the contextual indicator defines at least an action of a person proximate to the parked vehicle, and wherein the instructions to extract the feature include instructions to identify the action from movements of an object associated with the parked vehicle.

13. The non-transitory computer-readable medium of claim 9, wherein the instructions to analyze the feature include instructions to determine whether the feature is a mitigating factor that relates to at least one of: a delay in the parked vehicle departing and a waiting vehicle replacing the parked vehicle in the parking spot, and wherein the mitigating factor is associated with the waiting vehicle displaying a turn signal relative to the parking spot, and a person removing an item from the parked vehicle.

14. A method, comprising:

responsive to acquiring sensor data about a surrounding environment including at least one parked vehicle, extracting a feature from at least an image in the sensor data about a context of the parked vehicle;

analyzing the feature to determine a status of the parked vehicle in relation to whether the parked vehicle is remaining parked, including analyzing the feature for whether the feature is an object proximate to the parked vehicle, an action of a person proximate to the parked vehicle, and a characteristic of the parked vehicle, wherein the action includes placing an item into the parked vehicle or removing an item from the vehicle; and providing the status to inform additional vehicles about an availability of a parking spot of the parked vehicle.

15. The method of claim 14, wherein analyzing the feature includes determining whether the feature indicates that the parked vehicle is departing and a time until departure, and wherein extracting the feature from the sensor data includes applying a neural network to image data in the sensor data.

16. The method of claim 15, wherein determining the time until departure includes considering environmental factors, including a time of day, a day of a year, and a type of a location associated with the parking spot.

17. The method of claim 14, wherein extracting the feature includes deriving the feature as a contextual indicator that provides an inference about whether the parked vehicle is remaining parked by processing the sensor data using a prediction model,
   wherein the contextual indicator defines at least an action of a person proximate to the parked vehicle, and
   wherein extracting the feature includes identifying the action from movements of an object associated with the parked vehicle.

18. The method of claim 14, wherein analyzing the feature includes determining whether the feature is a mitigating factor that relates to at least one of: a delay in the parked vehicle departing and a waiting vehicle replacing the parked vehicle in the parking spot, and wherein the mitigating factor is associated with the waiting vehicle displaying a turn signal relative to the parking spot, and a person removing an item from the parked vehicle.

19. The method of claim 14, wherein providing the status includes communicating the status to at least one of: a remote device to inform additional vehicles about the availability of parking in a location and a driver of a monitoring vehicle.

20. The method of claim 14, wherein providing the status includes causing an additional vehicle to route by the parking spot to monitor whether the parked vehicle has departed.

* * * * *